Figure 1:
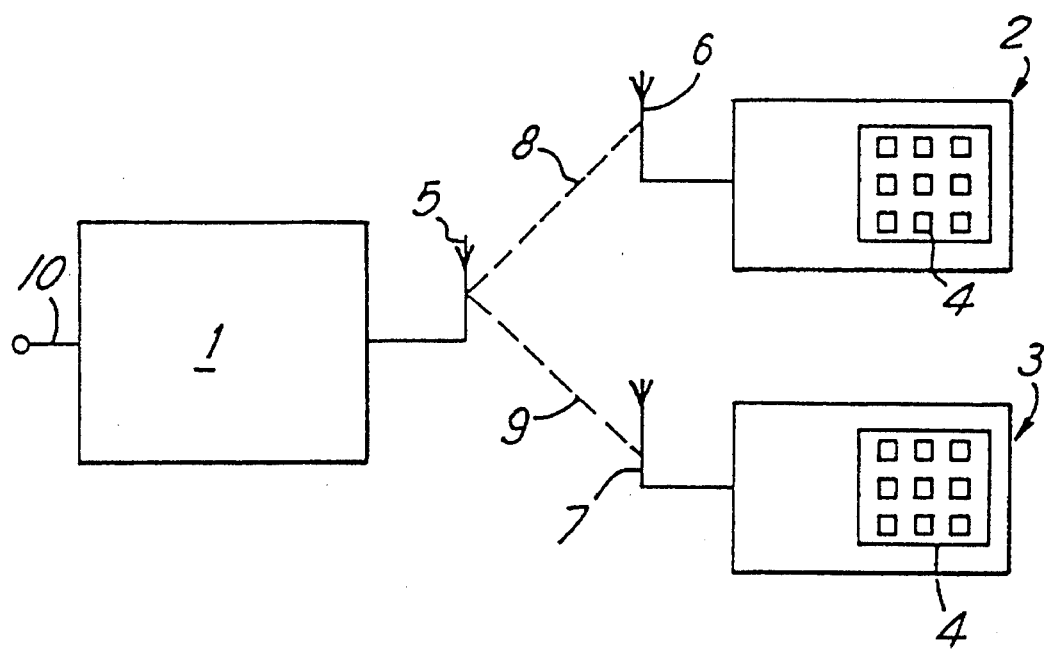

United States Patent

Beesley

[11] Patent Number: 5,583,854
[45] Date of Patent: Dec. 10, 1996

[54] METHOD OF ESTABLISHING A COMMUNICATION LINK IN A DIGITAL CORDLESS TELEPHONE SYSTEM

[75] Inventor: Graham E. Beesley, Winchester, United Kingdom

[73] Assignee: AT&T Wireless Communications Products, Ltd., Winchester, United Kingdom

[21] Appl. No.: 379,674

[22] PCT Filed: Aug. 18, 1993

[86] PCT No.: PCT/GB93/01749

§ 371 Date: Apr. 4, 1995

§ 102(e) Date: Apr. 4, 1995

[87] PCT Pub. No.: WO94/05107

PCT Pub. Date: Mar. 3, 1994

[30] Foreign Application Priority Data

Aug. 18, 1992 [GB] United Kingdom ............ 9217525
Nov. 5, 1992 [GB] United Kingdom ............ 9223207

[51] Int. Cl.⁶ .................. H04L 5/14; H04J 3/06
[52] U.S. Cl. ............ 370/278; 370/350; 370/507; 379/61; 379/63
[58] Field of Search .............. 370/29, 32, 100.1, 370/103, 107, 110.1, 18, 19, 21, 22; 379/58, 61, 63; 455/51.1, 54.1; 375/205

[56] References Cited

U.S. PATENT DOCUMENTS 5,103,459  4/1992  Gilhousen et al. .................... 375/1
5,228,026  7/1993  Albrow et al. ....................... 370/29

FOREIGN PATENT DOCUMENTS 375361   6/1990   European Pat. Off. ......... H04M 1/77
399610   11/1990  European Pat. Off. ......... H04M 1/72
2110055  6/1983   United Kingdom ............ H04Q 7/00
9103136  3/1991   WIPO ........................ H04Q 7/02

Primary Examiner—Douglas W. Olms
Assistant Examiner—Matthew C. Phillips
Attorney, Agent, or Firm—Wenderoth, Lind & Ponack

[57] ABSTRACT

A digital time-division duplex radio communication link is established or re-established between one of a plurality of portable units and one or more base units forming a cordless telephone system, so as to avoid potential interference created by the use of an unsynchronized call-up transmission in the presence of synchronized signals being exchanged by the rest of the system. The call-up transmission is pre-synchronized with the rest of the system so that switchovers between transmission bursts and reception windows occur at the same time as between the call-up signal and the rest of the system. This is achieved by deriving synchronization information from a synchronization signal which may, for example, be an existing signal on the system containing synchronization information (i.e., an existing call on the system) or may be a beacon signal which, in some systems, is transmitted by the fixed units for the purpose of range indication. The method is particularly applicable to the MUX1/MUX2/MUX3 format of signals used in the CT2 common air interface protocol.

10 Claims, 3 Drawing Sheets

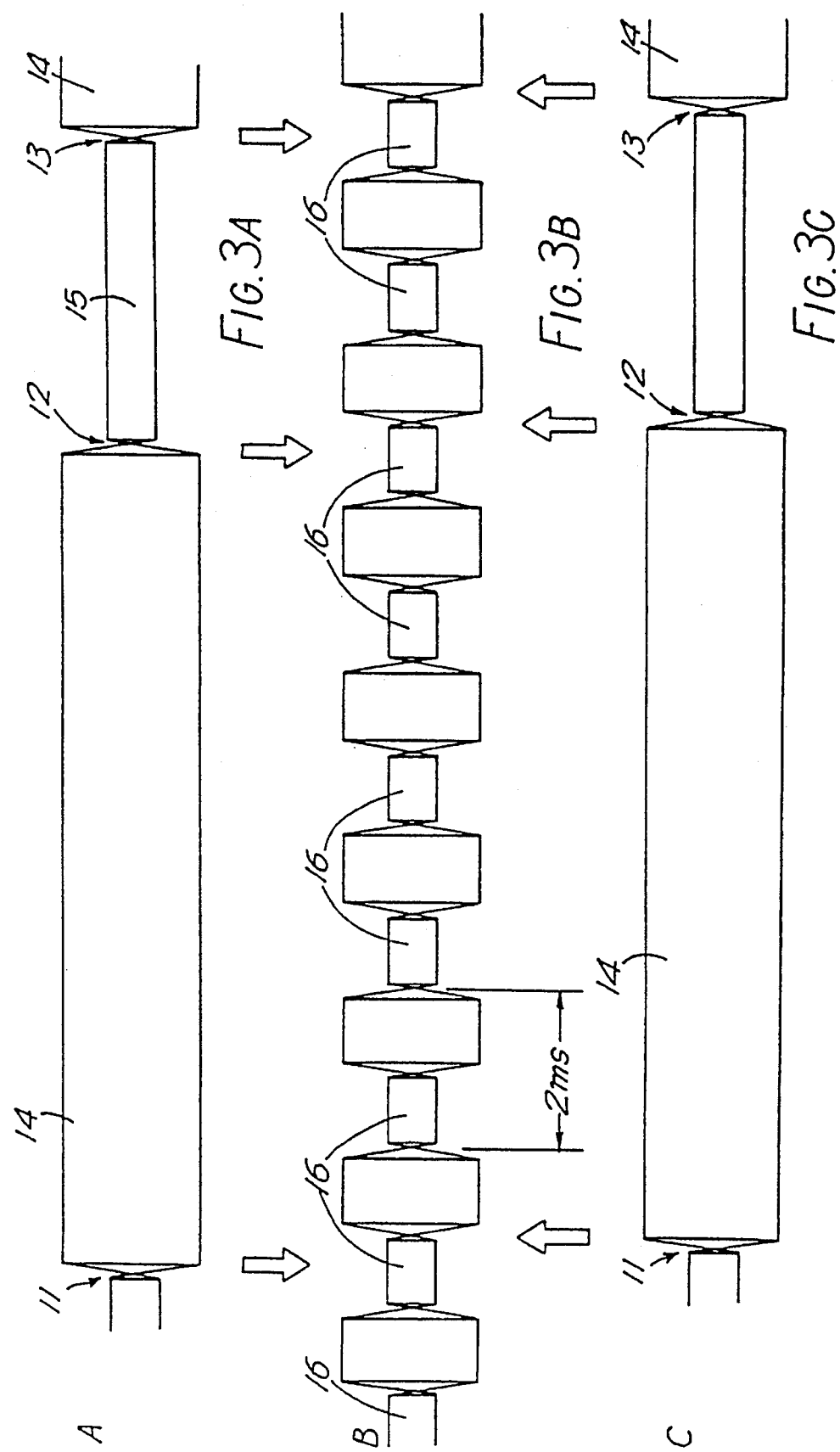

METHOD OF ESTABLISHING A COMMUNICATION LINK IN A DIGITAL CORDLESS TELEPHONE SYSTEM

The present invention relates to duplex communications systems, and to a method of establishing a digital time-division duplex radio communication link between one of a plurality of portable units and one or more base units forming a cordless telephone system. The invention is directed particularly at the interference problem created by the use of an unsynchronised transmission in the presence of synchronised systems.

Such a system is shown, in its simplest form, in FIG. 1 of the accompanying drawings to which reference will now be made. The system illustrated comprises a fixed part in the form of a base unit 1, and two portable parts in the form of respective handsets 2,3. Each handset comprises an earpiece, microphone and keypad, this latter being shown diagrammatically under reference 4. In addition, each handset contains a respective radio transmitter/ receiver (transceiver) and associated aerial 6,7 by which the handsets may communicate with the base unit by radio, as represented by the dotted lines 8,9. The base unit likewise contains a number of transceivers at least equal to the number of handsets, together with an aerial 5 for transmission and reception of radio signals from the handsets. The handsets may communicate with each other, but only via the base unit. The base unit also includes a hard-wired connection 10 to the external telephone system, and contains interface circuitry for interfacing the base unit transceiver to the external telephone line. Although only two handsets are shown, this is to be taken as an example of the simplest system and many more handsets, up to the capacity of the system, may be provided.

The present invention is concerned with systems of the type illustrated in FIG. 1, in which the speech and other information to be transmitted between the base unit and the handsets is digitally encoded before transmission, is transmitted as a digital signal, and is decoded after reception to reproduce the original. A limited number of radio channels are allocated for the radio links 8,9 and it is clearly therefore preferable to utilise the same channel for both ends of a radio link—i.e. duplex communication. Each transceiver in the system will be able to transmit and receive on a number of these channels, if not all.

In digital second generation (CT2 ) cordless telephone systems, burst mode duplex is used to provide full duplex speech on a single channel. This essentially means that each transmitter has to compress the encoded speech from a particular time interval (called the burst period) down to just under half that interval (called the burst duration) in order to transmit the encoded speech and have time to receive the returning encoded speech in the other half of the burst period. This action is commonly called ping-pong transmission mode. it should be noted that the encoded speech corresponds to the speech from the entire burst period and on reception is expanded to its normal representation as continuous speech.

There is a need for a common protocol for the exchange of signals, primarily control and synchronising signals, between the fixed and portable parts of the system. In the case of CT2, such a protocol, known as a common air interface (CAI), has been agreed and is described in detail in international patent application WO90/09071. A knowledge of the contents of this application is desirable for a full understanding of the present invention. The present applicant's own air interface, a variant of the common air interface is described in European patent application 0375361.

In the agreed protocol, exchange of signals is by way of three distinct transmitted burst signal patterns or structures exchanged between the fixed and portable parts of the system. These different burst structures are known respectively as MUX3, MUX2 and MUX1, the acronym "MUX " standing for multiplex. In addition, the agreed protocol defines three sub-channels to be multiplexed within the available data bandwidth:

i) a signalling channel (D channel);

ii) a speech channel (B channel;

iii) a burst synchronisation channel (SYN channel) containing bit and burst synchronising information.

The structure of the various multiplexes is described in detail in the above-mentioned patent applications. Briefly the arrangement of sub channels within the multiplexes is as follows:

MUX1 is used hi-directionally over an already-established link between a portable part and a fixed part to carry the D and B channels. There are no SYN channel bits in MUX1. MUX1 supports both the 66 bit and 88 bit length burst structures defined in the protocol: MUX 1.4 is 68 bits long, having 64 B bits, with 2 D bits at either end; and MUX1.2 is 66 bits long, having 64 B bits, with 1 D bit at either end.

MUX2 is used for link establishment, and for re-establishment of a previously-broken link. MUX2 comprises 34 bits in the SYN channel sandwiched between 32 bits (16 at each end) in the D channel i.e. 66 bits long. There are no B channel bits in MUX2.

Figure 2:
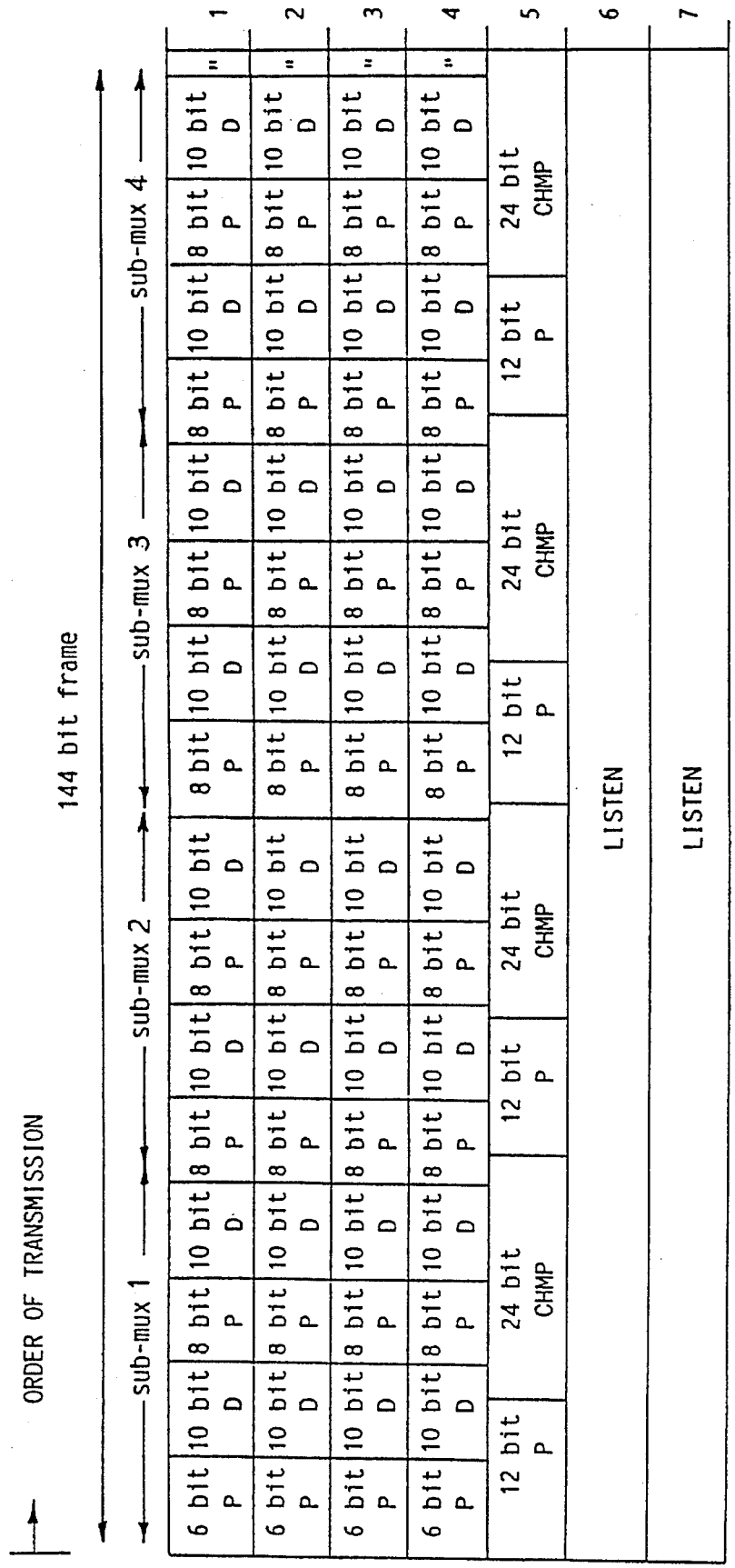

MUX3 is used for link establishment and re-establishment in the direction portable part to fixed part only. A representation of MUX3 is shown in FIG. 2 and will be seen to comprise seven frames, numbered 1 to 7 down the right-hand side, each 144 bits long, and of which the first five frames (1 to 5) are transmitted in sequence. The order of bits within each of frames 1 to 5 is from left to right in the diagram. The first four frames, 1 to 4, contain D-channel bits, and comprise 20 bit D-channel words each split into two 10-bit sections surrounded by preamble (P) bits. The fifth frame comprises 24 SYN channel bits surrounded by 24 preamble (P) bits (12 at each end). During frames 6 and 7, the transceiver in the portable part listens for a response from a fixed part. The sequence then repeats.

The MUX3 sequence thus comprises 5 transmission bursts, lasting for a total of 10 ms, followed by two transmission-off burst periods lasting for 4 ms during which the transceiver is in receive mode. In practice, this sequence is repeated for a period of at least 750 ms, or until a link is established.

This use of a multiple repeat transmission to set up a link is known, and the MUX3 protocol just described is but one example of this. In the case of the CT2 protocol, the fixed part is restricted as to which receive window it may use to receive transmissions from the portable part. The portable part must therefore transmit in a manner suitable for an arbitrary window and previously this has implied an unsynchronised transmission.

In the present invention, the synchronism of the system is deduced, and used to adjust the timing of the previously unsynchronised transmission to make it effectively synchronous without actually changing its form. The technique can be used both for initial establishing of the two-way link, and for re-establishment of an existing link which has failed.

In dense usage environments communications systems are synchronised so that the AM (amplitude modulation)

splatter caused by the repeated switching on and off of transmissions occurs in a "guard band" which is maintained between the termination of transmission from one part of the system and the start of transmission from the other part of the system. Thus the splatter is rendered harmless. However, the use of an unsynchronised call up transmission, such as MUX3, at the time of establishing or re-establishing a link causes interference because the AM splatter does not necessarily occur in the guard band, but at arbitrary times throughout the reception phase of the rest of the system.

The practical effect of the present invention is that it is now possible to pre-synchronise the call-up transmission. For example, in the case of MUX3, the transmission comprises a 10 ms transmit, followed by a 2 ms receive. Since the frame rate of the CAI CT2 system is 2 ms (144 bit frame size) then, provided that one of the on/off transitions of MUX3 is aligned with the system guard band, the opposite transition will also be aligned because the MUX3 transmission can be considered as blocks of the same size (2 ms; 144 bits) as the system frame rate. In this way, MUX3 becomes synchronised to the system guard band and therefore ceases to be an asynchronous interference source with the detrimental effects of splatter.

In order to enable synchronisation to be effected, the unit, normally the portable part, which is to transmit the call-up signal 1s set to receive a suitable synchronisation signal which is used to synchronise the call-up signal to the rest of the system. This synchonisation signal can be derived in various ways. Preferably the synchronisation signal is taken from an existing signal which is being transmitted within the system. For example an existing call elsewhere on the system can be used to derive synchronisation information. Alternatively an agreed off-air synchronisation signal could be used, such as a standard time and frequency reference signal. As a still further, and currently preferred, alternative an existing system beacon signal could be used to supply the synchronisation information to the portable part.

A system beacon signal is sent out by one or all of the fixed units on one channel of the band, and is primarily intended as a range indicator to let a portable unit know when it is in range, and this enables the portable unit to log onto the base unit. In the CT2 CAI system, the beacon signal, if present, comprises continuous multiple repeats of MUX2 and thus contains the synchronisation information which a portable unit needs to establish synchronisation for its call-up signal, be this MUX3 or equivalent.

In order that the invention may be better understood, an embodiment thereof will now be described by way of example only and with reference to FIG. 3 of the accompanying drawlngs in which;

FIG. 1 is a block diagram showing the simplest form of communications system with which the present invention is concerned;

FIG. 2 is a diagram of the signal pattern used in the call-up signal under the MUX3 protocol; and FIG. 3 is a diagram of the RF waveform envelopes used in a typical communications system of the type shown in FIG. 1: FIG. 3A shows an unsynchronised call-up sequence, FIG. 3B shows the normal ping-pong sequence used once a link has been set up, and FIG. 3C shows a synchronised call-up sequence in accordance with the present invention.

Using as an example the MUX1/2/3 protocol briefly described above, the procedure to establish a new link would in detail be as follows:

1 ) The portable part learns the synchronisation of the target system, for example from a system beacon transmitting MUX2 on one of the channels of the band.

2 ) Optionally the portable part may adjust its frequency to that of the system.

3 ) The portable unit selects a channel on which to make its call to the fixed part. There are various ways in which this selection can be made, but these are known, and will not be described.

4 ) The portable unit sets the phase of its MUX3 call-up transmission to coincide with that of the system, ensuring that the disruption to the system is minimised by centering the AM splatter within the system guard band. The optimum setting is approximately such that the 5th bit of the MUX3 transmission occurs at the same time as the first valid data bit in MUX2.

5 ) The portable part transmits MUX3 in the same way as hitherto.

6 ) Optionally the portable part checks synchronisation at suitable intervals to permit any drift to be corrected. For CT2 CAI the worst case drift in the system without step 2 would incur 7.2 bits of drift per second. Approximately 1 bit of drift could be tolerated before the onset of some degradation. With step 2 included a much longer period would elapse before the critical amount of drift had occurred.

For link re-establishment after failure of an existing link the same procedure may be used as described above, but with the additional option of using the originally set-up link (i.e. the link as it existed before failure) as the source of synchronisation in step 1, rather than the system beacon. Synchronisation information can be constantly stored within the fixed part for this purpose, and used to synchronise the re-established link.

The procedure described above is fully compatible with non-synchronising systems and simply falls back to the non-synchronised method in the absence of a suitable system synchronisation reference —i.e. only steps 3 and 5 above are invoked.

The attached FIG. 3 is a timing diagram illustrating the above-described techniques. The drawing is divided horizontally into 3 parts: FIG. 3A illustrates the unsynchronised MUX3 call-up signal from the portable part; FIG. 3B illustrates the transmission of MUX1 or MUX2 from a fixed part; and FIG. 3C illustrates the MUX3 transmission from the portable part, synchronised in the manner discussed above with the base unit transmissions.

In FIG. 3, the taller blocks represent bursts of transmission and the shorter blocks represent reception windows. In between transmission and reception blocks the graphs fall to zero and rise again to represent diagrammatically the changeover from one mode to another, this in between period comprising the above-referred to guard band. The top waveform (FIG. 3A) is unsynchronised with the MUX1 or MUX2 waveform represented in the centre part of the drawing (FIG. 3B) and it will be seen that all three guard bands 11, 12 and 13 in the change-over from MUX3 transmission 14 to reception 15 occur during reception windows 16 of the MUX1/MUX2 waveform illustrated in FIG. 3B, thus resulting in am splatter. By contrast, the bottom waveform (FIG. 3C) is synchronised with the MUX1/ MUX2 waveform illustrated in FIG. 3B, so that any interference occurring during the changeover from transmission to reception in MUX3 is rendered harmless.

It will be noted that the total length of a single transmission burst and reception window, together with associated guard bands, amounts to one frame, having a period of 2 ms. This is a submultiple of the MUX3 transmission burst (10 ms) and MUX3 reception window (4 ms) and thus enables the call-up signal guard bands and the normal ping-pong communications signal guard bands to be brought into synchronism, as illustrated with reference to FIG. 3B and FIG. 3C.

I claim:

1. A method of establishing or re-establishing a digital time-division duplex radio communication link between one of a plurality of portable units and one or more base units forming a cordless telephone system, said method comprising sending a call-up signal from one of the portable units to the base unit or units, or vice versa, in order to establish or re-establish a two-way radio link between said one portable unit and one of the base units, said method being characterised in that, prior to sending out such a call-up signal, the unit which is to send the call-up signal deduces the synchronism of the system, and adjusts the timing of the call-up signal so as to make it effectively synchronous with the system;

wherein communication between the portable units and base units within the system takes place by means of bursts of transmission and reception windows, occurring alternately, with a short time period, referred to as the guard band between the end of transmission and the start of reception, and between the end of reception and the start of the next transmission, and wherein the call-up signal comprises a call-up transmission burst alternating with a reception window with a guard band in between, the method being operable to adjust the timing of the call-up. Signal such that each of its guard bands coincides in time with a system guard band.

2. A method as claimed in claim 1 wherein the unit which is to send the call-up signal is set to receive a synchronisation signal, which signal acts to synchronise the call-up signal to the rest of the system.

3. A method as claimed in claim 2 wherein, upon receiving said synchronisation signal, the unit which is to send the call-up signal sets the phase of its call-up signal to coincide with that of the system.

4. A method as claimed in claim 3 wherein said synchronisation signal is derived from an existing signal which is being transmitted within the system.

5. A method as claimed in claim 4 wherein said existing signal is derived from an existing call elsewhere on the system.

6. A method as claimed in claim 3 wherein said synchronisation signal takes the form of an agreed off-air synchronisation signal.

7. A method as claimed in claim 6 wherein said off-air synchronisation signal is a standard time and frequency reference signal.

8. A method as claimed in claim 3 wherein said synchronisation signal is derived from a system beacon signal which is transmitted continuously by one or more of the units belonging to the system.

9. A method as claimed in claim 8 wherein said system beacon signal is transmitted by one or more of the base units in the system.

10. A cordless telephone system comprising one or more base units and a plurality of portable units, each unit having a transceiver and a controlling means for establishing or reestablishing, in response to a transmission of a call-up signal by one of said units, a digital and time-division duplex radio communication link between one of said portable units and one or more of said one or more base units, wherein each portable unit comprises a synchronization deduction and signal timing means for, prior to said each portable unit sending the call-up signal, deducing the synchronization of said system and adjusting the timing of the call-up signal so as to make it effectively synchronous with said system;

wherein communication between the portable units and base units within the system takes place by means of bursts of transmission and reception windows, occurring alternately, with a short time period, referred to as the guard band, between the end of transmission and the start of reception, and between the end of reception and the start of the next transmission, and wherein the call-up signal comprises a call-up transmission burst alternating with a reception window with a guard band in between, the apparatus including means for adjusting the timing of the call-up signal such that each of its guard bands coincides in time with a system guard band.

* * * * *